United States Patent
Le Ravalec et al.

(10) Patent No.: US 10,794,155 B2
(45) Date of Patent: Oct. 6, 2020

(54) METHOD FOR EXPLOITING A HYDROCARBON DEPOSIT BY HISTORY MATCHING OF PRODUCTION AS A FUNCTION OF DIAGENESIS

(71) Applicants: IFP Energies nouvelles, Rueil-Malmaison (FR); Repsol S.A., Madrid (ES)

(72) Inventors: Mickaele Le Ravalec, Rueil-Malmaison (FR); Mickael Barbier, Chatou (FR); Maria Fernanda Leon Carrera, Madrid (ES); Brigitte Doligez, Paris (FR)

(73) Assignees: IFP ENERGIES NOUVELLES, Rueil-Malmaison (FR); REPSOL S.A., Madrid (ES)

( * ) Notice: Subject to any disclaimer, the term of this patent is extended or adjusted under 35 U.S.C. 154(b) by 429 days.

(21) Appl. No.: 15/826,459

(22) Filed: Nov. 29, 2017

(65) Prior Publication Data
US 2019/0162053 A1    May 30, 2019
US 2019/0277114 A9    Sep. 12, 2019

(30) Foreign Application Priority Data

Nov. 29, 2016 (FR) ..................... 16 61634

(51) Int. Cl.
*E21B 41/00* (2006.01)
*E21B 43/00* (2006.01)
(Continued)

(52) U.S. Cl.
CPC .......... *E21B 41/0092* (2013.01); *E21B 43/00* (2013.01); *G01V 99/00* (2013.01);
(Continued)

(58) Field of Classification Search
None
See application file for complete search history.

(56) References Cited

U.S. PATENT DOCUMENTS

2008/0243447 A1    10/2008    Roggero et al.
2009/0070086 A1    3/2009    Le Ravalec et al.

FOREIGN PATENT DOCUMENTS

EP    1978379 A1    10/2008
EP    2034130 A2    3/2009

OTHER PUBLICATIONS

Gallo, Y. Le et al., "Coupled Reaction-Flow Modeling of Diagenetic Changes in Reservoir Permeability, Porosity and Mineral Composition", Jun. 30, 1998, Journal of Hydrology 209, Elsevier Science B.V. (Year: 1998).*

(Continued)

*Primary Examiner* — Cedric Johnson
(74) *Attorney, Agent, or Firm* — Fitch, Even, Tabin & Flannery LLP (57) ABSTRACT

The invention is a method for exploiting a subterranean formation including hydrocarbons with at least one lithologic facies of the formation having undergone at least one diagenetic phase over geological times. From at least one sample of rock obtained from the formation, from measured production data relating to the formation and from a meshed representation representative of the formation, each mesh of the meshed representation is determined including at least one indicator relating to the distribution of the facies present in the mesh. The method comprises a step of history matching in which at least one of the adjustment parameters is the diagenetic state of the identified facies.

25 Claims, 4 Drawing Sheets

(51) Int. Cl.

| | | |
|---|---|---|
| *G01V 99/00* | (2009.01) | |
| *G06F 30/20* | (2020.01) | |
| *E21B 43/20* | (2006.01) | |
| *E21B 49/02* | (2006.01) | |
| *G06F 111/10* | (2020.01) | |

(52) U.S. Cl.
CPC .............. *G06F 30/20* (2020.01); *E21B 43/20* (2013.01); *E21B 49/02* (2013.01); *G01V 99/005* (2013.01); *G01V 2210/663* (2013.01); *G01V 2210/665* (2013.01); *G06F 2111/10* (2020.01)

(56) References Cited

OTHER PUBLICATIONS

Salib, Mina Sameh et al., "3D Depostional and Dlagnetic Facies Modeling: An Integrated Approach to Capture Heterogeneities in a Lower Cretaceous Carbonate Reservoir", Nov. 7-10, 2016, Abu Dhabi International Petroleum Exhibition & Conference, Society of Petroleum Engineers. (Year: 2016).*

Pontiggia, M. et al., "New Integrated Approach for Diagenesis Characterization and Simulation", Feb. 14-17, 2010, SPE North Africa Technical Conference & Exhibition, Society of Petroleum Engineers. (Year: 2010).*

Le Ravalec, Mickaele et al., "Integrated Reservoir Characterization and Modeling", 2014, Energies Nouvelles. (Year: 2014).*

Tillier, E. et al., "Local and Continuous Updating of Facies Proportions for History-Matching", 2010, Journal of Petroleum Science and Engineering, 73, Elsevier B.V. (Year: 2010).*

Preliminary Search Report (2 pages).

M Pontiggia et al: "New Integrated Approach for Diagenesis Characterization and Simulation", (Feb. 14, 2010), XP055393464, SPE Conference in Cairo, Egypt.

Tillier et al: "Local and continuous updating of fades proportions for history-matching", Journal of Petroleum Science and Engineering, Elsevier, Amsterdam, NL, vol. 73, No. 3-4, (Sep. 1, 2010), pp. 194-203.

* cited by examiner

METHOD FOR EXPLOITING A HYDROCARBON DEPOSIT BY HISTORY MATCHING OF PRODUCTION AS A FUNCTION OF DIAGENESIS

CROSS REFERENCE TO RELATED APPLICATIONS

Reference is made to French Application No. 16/61.634 filed Nov. 29, 2016, which is incorporated herein by reference in its entirety.

BACKGROUND OF THE INVENTION

Field of the Invention

The present invention relates to the exploration and the exploitation of oil deposits or geological gas storage sites.

Description of the Prior Art

The exploration and the exploitation of a deposit, particularly oil, entails acquiring a knowledge that is as accurate as possible of the subterranean geology, in order to allow for an estimation of the reserves, an estimation of the production, or even the definition of how to manage the exploitation of the deposit over time. Indeed, the determination of the placement of a production well or of an injection well in a hydrocarbon deposit, the make-up of the drilling mud, the completion characteristics, the choice of a hydrocarbon recovery method (such as water injection for example) and of the parameters necessary to the implementation of this method (such as the injection pressure, the production flow rate, etc.) require a good knowledge of the deposit.

To acquire this knowledge, the oil industry combines using the measurements in the field (performed in situ, during seismic campaigns, of measurements in wells, of corings, etc.) with the measurements performed in a laboratory as well as with numerical simulations (performed by software, such as a flow simulator).

Formalizing this knowledge then involves establishing a model, also called geological model, that has the objective of showing, in an approximate manner, both the structure and the behavior of a deposit. This type of model is generally represented on a computer, in the form of a meshed representation (which can be a regular grid, or even a structured or more generally unstructured meshing). Each of the meshes of the meshed representation include at least one, and preferentially multiple values of petrophysical properties relative to the deposit itself (such as porosity, permeability, facies, etc.) and/or of properties relating to the fluids present in the deposit (water/oil/gas saturations, relative permeabilities, etc.).

When a meshed representation that conforms to all the data measured in the field is finally obtained, this representation is used to predict the fluid movements in the formation under study and to plan its future development, via the determination of exploitation schemes. For this, it is required 1) to select the zones of interest (exhibiting the highest hydrocarbon levels for example) in which to drill new wells, 2) to place these wells accurately in the three dimensions of space, 3) to define at least one recovery method (water, gas, vapor injection, etc.) and 4) to check, for example via a flow simulation, whether the hydrocarbon production, with this layout of the wells and this recovery method, is optimal. A flow simulation, which is also called reservoir simulation, is a technique that makes it possible to simulate the flows of fluids by software called a flow simulator and a meshed representation of the formation under study.

The creation of a meshed representation that is realistic with respect to the flows generally comprises history matching. History matching modifies some of the parameters of a reservoir model, such as the permeabilities, the porosities or the skins of wells (representing damage around the well), the fault connections, etc. to minimize the deviations between the simulated and measured history data. History data is the term used for the production data obtained from measurements at the wells in response to the production of the reservoir (oil production, water production from one or more wells, gas/oil ratio (GOR), proportion of production water ("water cut"), and/or the repetitive seismic data (4D seismic impedances in one or more regions, etc.).

During history matching, an objective function is defined which measures the deviations between the observed history data and the simulated history data. Then, a process of minimization of the objective function is put into place. This minimization is generally driven by an optimization algorithm, based on a computation of gradients of the objective function. Other techniques make it possible to sample the space of the models complying with the production data rather than seek to achieve the most probable model out of the latter (for example, the genetic algorithms or simulated annealing).

The following documents will be cited in the description:

Barbier, M., Hamon, Y., Doligez, B., Callot, J.-P., Floquet, M., Daniel, J.-M., 2012, Stochastic Joint Simulation of Facies and Diagenesis: A Case Study on Early Diagenesis of the Madison Formation (Wyoming, USA), OGST, 67(1), 123-145

Caers, J., Hoffman, T., The Probability Perturbation Method: A New Look at Bayesian Inverse Modeling, Math. Geol., 38(1), 81-100, 2006, DOI:10.1007/s11004-005-9005-9

Doligez, B., Hamon, Y., Barbier, M., Nader, F., Lerat, O., 2011, Advanced Workflows for Joint Modelling of Sedimentary Facies and Diagenetic Overprint. Impact on Reservoir Quality, SPE 146621, SPE ATCE, Denver, Colo., USA Gosselin, O., Cominelli, A. van den Berg, S. et Chowdhury, S. D.: "A Gradient-Based Approach for History Matching of Both Production and 4D Seismic Data", Proceeding 7th European Conference on the Math. of Oil Recovery, Baveno, Italy, 2000)

Guardiano, F., Srivastava, M., 1993, Multivariate Geostatistics: Beyond Bivariate Moments, In: Soares, A. (Ed.), Geostatistics-Troia. Kluwer Academic Publications, Dordrecht, 133-144, http://dx.doi.org/10.1007/978-94-011-1739-5_12.

Holland, J. H., 1975, Adaptation In Natural And Artificial Systems, University Of Michigan Press, Ann Arbor Hu, L.-Y., 2000, Gradual Deformation and Iterative Calibration of Gaussian-Related Stochastic Models, Mathematical Geology, 32(1), 87-108

Le Ravalec-Dupin, M., Da Veiga, S., Cosimulation as a Perturbation Method for Calibrating Porosity and Permeability Fields to Dynamic Data, Computers and Geosciences, 37, 1400-1412, 2011, DOI:10.1016/j.cageo.2010.10.013

Le Ravalec, M., Doligez, B., Lerat, O., 2014, Integrated Reservoir Characterization and Modeling.http://books.ifpenergiesnouvelles.fr/ebooks/integrated Reservoir Characterization_and_Modeling/, doi: 10.2516/ifpen/2014001

Le Ravalec, M., Hu, L.-Y., Noetinger, B., 1999, Stochastic Reservoir Modeling Constrained to Dynamic Data: Local Calibration and Inference of the Structural Parameters, SPE 56556, SPE ATCE, Houston, Tex., USA Pontiggia, M., Ortenzi, A., Ruvo, L., 2010, New Integrated Approach for Diagenesis Characterization and Simulation, SPE 127236, SPE North Africa Technical Conference and Exhibition, Cairo, Egypt Press, W. H., Teufolsky, S. A., Vetterling, W. T., Flannery, B. P., 1988, Numerical Recipes in C, Cambridge University Press, New York, N.Y., USA Renard, D., Beucher, H., Doligez, B., 2008, Heterotopic Bi-categorical Variables in Pluri-Gaussian Truncated Simulation, VIII Int. Geostat. Congress, GEOSTATS 2008, 1, pp. 289-298

Roggero, F., Enchery, G., Ponsot-Jacquin, C., 2011, Method for Gradually Modifying Lithologic Facies Proportions of a Geological Model, U.S. Pat. No. 7,970,593

Tarantola, A., 1987, Inverse Problem Theory—Methods For Data Fitting And Model Parameter Estimation. Elsevier Science Publishers, Amsterdam, The Netherlands, 613 pp Tillier, E., Enchery, G., Le Ravalec, M., Gervais, V., 2010, Local and Continuous Updating of Facies Proportions for History-Matching, Journal Petroleum Science and Engineering, 73(3-4), 194-203

History matching techniques are known for which the adjustment parameters relate to the lithologic facies encountered in the subterranean formation studied.

The technique described in EP 1978379 A1 (corresponding to U.S. Pat. No. 7,970,593) can in particular be cited, which modifies the proportions of facies in each of the meshes of the meshed representation representative of the formation under study so as to minimize a deviation between simulated production data and measured production data, flow properties (porosity, permeability for example) being attributed to each of the lithologic facies being considered. More specifically, this technique describes an iterative adjustment of the proportions of facies while observing certain rules of proportionality of the facies defined by the engineer.

Also known is the technique described in the document (Le Ravalec et al., 1999) which adjusts the spatial variability (parameterized by the range of a variogram) of the facies in the meshed representation to minimize a deviation between simulated production data and measured production data.

However, it appears that, to date, the effects of the diagenetic processes are not taken into account in the updating of the reservoir model by history matching. Now, diagenesis is one of the major physical-chemical processes in the history of a sedimentary basin. Diagenesis encompasses all the processes of chemical, biochemical and physical transformation of the sediments deposited in a basin, into compact sedimentary rocks. In effect, the sediments which are deposited in a sedimentary basin are unconsolidated and water-rich. The processes affect these sediments as soon as they are deposited and continue throughout the process of their burial, that is to say, as other sediments come to cover them progressively under several tens, hundreds or even thousands of meters of substance. At such depth, the diagenetic processes are influenced by the pressure and temperature conditions.

These transformations proceed according to various steps, also called diagenetic phases, which vary according to the nature of the sediments, the nature of the fluids flowing between these sediments and the burial conditions.

These processes comprise, among others, the compaction (mechanical packing down linked to the weight of the soils deposited on top of the sediment. This process tends to reduce the porosity in the rock and to increase the points of contact between the grains), the dissolution of the grains at their points of contact, or even the cementation (precipitation of crystals of a given mineral in the inter-granular spaces linking the sedimentary particles together).

The analysis of thin slices extracted from a coring taken from a subterranean formation makes it possible to study the diagenetic history of a rock. It particularly involves defining the succession over time of all of the mineralogical transformations that have affected the sediments since their deposition. It is possible to qualify and quantify the proportion of each of these mineralogical transformations in a given sample either visually, by defining, for example, a type and/or a degree of diagenesis (corresponding to a low, medium or high proportion of a given diagenetic phase), or in a laboratory by laboratory techniques (DRX, elementary geochemistry, etc.), or even by image analysis by using image processing software. However, this information is fragmented, at a few points along the well from which the core sample was extracted. The extrapolation of this fragmented information, between the wells, is therefore uncertain. Now, the physical-chemical processes undergone by a sedimentary deposit during the diagenesis significantly affect the flow properties of the rock resulting from this sedimentary deposition. Consequently, it may be that the meshed representations used in the conventional oil exploration and exploitation steps, in particular in a history matching, are based on erroneous assumptions concerning the diagenetic state of the different facies present in a formation.

SUMMARY OF THE INVENTION

The present invention accounts for the diagenetic state of a rock as one of the adjustment parameters in a history matching.

Generally, the invention relates to a method for exploiting a subterranean formation including hydrocarbons. The formation includes at least one facies having undergone at least one diagenetic phase over geological times, from at least one sample of rock obtained from the formation, from measured production data relating to the formation and from a meshed representation representative of the formation. The meshed representation is formed by meshes with each of the meshes of the meshed representation including at least one indicator relating to the distribution of the facies present in the mesh. The method according to the invention comprises at least the following steps:

A) from at least measurements performed on the sample, for at least one of the facies and for each of the meshes of the meshed representation, a value of at least one parameter of the diagenetic state of the facies is determined;

B) from the measured production data, for at least one mesh of the meshed representation, at least the values of the parameters of the diagenetic state of at least one of the facies is updated according to at least the following steps:

i. for each of the meshes of the meshed representation, from the values of the determined parameters of the diagenetic state of the facies, at least one petrophysical property is determined relating to the flow in the formation;

ii. by using a flow simulator and the meshed representation filled with petrophysical properties relating to the flow, production data relating to the formation are simulated;

iii. an objective function measuring at least one difference between the measured production data and the simulated production data is determined;

iv. for at least one of the meshes of the meshed representation, from the objective function, at least the value of the parameter of the diagenetic state is modified for one of the facies;

and the steps i) to iv) are reiterated until a predetermined stop criterion is reached;

C—from at least the updated meshed representation, a scheme for exploiting the hydrocarbons of the formation is determined, and the hydrocarbons of the formation are exploited.

According to one implementation of the invention, the parameter representative of the diagenetic state of one of the facies can correspond to the spatial variability of at least one diagenetic degree of at least one of the diagenetic phases undergone by the facies.

According to a variant of the invention, the spatial variability can be parameterized by the range of a variogram relating to the distribution of the diagenetic degree of the diagenetic phase.

According to one implementation of the invention, the parameter representative of the diagenetic state of one of the facies can correspond to the proportion of at least one diagenetic degree of at least one of the diagenetic phases undergone by the facies.

According to a variant of the invention, the parameter can correspond to the proportion of one of the diagenetic degrees, the proportions of the other diagenetic degrees remaining constant relatively.

According to one implementation of the invention, in the step B, a parameter representative of the distribution of the facies in the formation and/or one of the petrophysical properties relating to the flow in the formation can further be updated.

According to one embodiment of the invention, the step B) ii) can be performed by using a bi-plurigaussian simulation.

According to a variant implementation of the invention, the stop criterion can correspond to a minimum of the objective function, to a maximum number of iterations of the step B), or even to a maximum difference between the measured production data and the simulated production data.

Advantageously, the determination of the exploitation scheme can comprise the determination of the position and of the geometry of injection and/or production wells, and/or the determination of the type of assisted recovery.

Furthermore, the invention relates to a computer program product that can be downloaded from a communication network and/or saved on a computer-readable medium and/or that can be executed by a processor, comprising program code instructions according to any one of the variants of the invention, when the program is run on a computer.

Other features and advantages of the method according to the invention will become apparent on reading the following description of nonlimiting exemplary embodiments, with reference to the attached figures described hereinbelow.

BRIEF DESCRIPTION OF THE DRAWINGS

FIG. 1b presents the distribution of the diagenetic degrees by facies for the same section with z constant as that presented in FIG. 1a.

DETAILED DESCRIPTION OF THE INVENTION

Generally, of the invention relates to a method for exploiting a subterranean formation including hydrocarbons. This method comprises a step of history matching in which at least one of the adjustment parameters is the diagenetic state of at least one lithologic facies encountered in the subterranean formation.

The following definitions are used in the description of the invention:

Facies: Facies, or even lithologic facies, are a class of rocks exhibiting the same characteristics. For example, the lithologic facies can refer to the geological nature of rock (clay, sandstone, limestone, etc.), to its type of porosity (rock not consolidated and very porous; rock not very porous, etc.), to the nature of the fluid trapped in its porosity (brine; oil; gas, etc.). This type of information is most commonly represented by a category property, that is to say by a finite set of symbolic values, represented by categories (for example the categories C0, C1, C2, etc.). It concerns a property that is particularly sensitive for the exploitation of a reservoir. In particular, the properties of lithologic facies can have a major impact on the dynamic behavior of an oil field. They can be identical over all the range (stationary case) or vary according to the position (non-stationary case).

Parameter representative of the diagenetic state of a facies: This is a parameter which reflects physical-chemical processes undergone by a facies. In particular, it can be a parameter relating to the different phases of diagenesis undergone by a given facies in a subterranean formation, such as a parameter describing the spatial variability of the diagenetic phases undergone by a given facies, or the variability of the proportions of the diagenetic phases observed in one and the same facies. It can also be a parameter describing the spatial variability of the diagenetic degrees of each of the diagenetic phases undergone by a given facies, or even proportions of the diagenetic degrees of each of the diagenetic phases observed in one and the same facies.

The method according to the invention requires the availability:

Of at least one rock sample from the subterranean formation studied: This sample can have been taken in situ, by coring for example;

Of measured production data relating to the subterranean formation being studied: These are data measured physically on a deposit, relating to the production from this deposit. It can be the cumulative volume of oil produced, the oil flow rate, the "water cut" (ratio of the volume of water produced to the total volume of liquid produced), the pressure, the ratio of the volume of gas to the volume of oil, etc. It can also be a well test. These production data are measured in wells drilled in the subterranean formation being studied.

Of a meshed representation of the formation: This is a model of the subterranean formation being studied, represented generally on a computer in the form of a meshing or grid, Each of the meshes of this grid includes one or more values of properties relating to the formation studied. According to the invention, the meshed representation includes, in each mesh, at least one piece of information on the distribution of the facies present in the mesh being considered. The distribution of the facies in a mesh can be the percentage of each of the facies present in the mesh considered. A facies can be represented in the form of a category property, that is to say a finite set of symbolic values, represented by categories (for example the categories C0, C1, C2, etc.). According to one implementation, the data in the wells (well log data) are used to determine one or more curves of vertical proportions of facies. These curves give the probability of occurrence of each facies as a function of the depth. These curves are then used to construct, using in particular kriging techniques, a matrix of proportion of facies, which determines, for each mesh of the grid representative of the reservoir, the probabilities of occurrence of the different facies. According to one implementation of the invention, the meshed representation corresponds to the geological model, constructed in order to describe as accurately as possible the structure and the properties (in the present case, at least one distribution of the different facies in each mesh) of the formation being studied. The purpose of a geological model is to verify as much as possible the properties being relating to the formation being studied which are collected in the field. The well log data measured along wells, the measurements performed on rock samples taken in the wells, the data deduced from seismic acquisition campaigns, or even production data such as oil and water flow rates, pressure variations, etc. According to one implementation of the invention, the meshed representation also includes properties necessary for a flow simulation, such as porosity, permeability, saturation values in each of the meshes of the meshed representation, values which will be updated by the method according to the invention. The oil exploration and exploitation expert is fully aware of the techniques for constructing such a meshed representation of a formation. The geological model generally has fine meshes and, consequently, a large number of meshes. Since the history matching requires several flow simulations to be performed, it may prove necessary to determine a meshed representation with larger meshes, in order to reduce the computation time of the flow simulations. This step, well known in the field of oil exploration and exploitation, performs an "upscaling", which makes it possible to switch from a representation with fine meshes to a representation with coarse meshes, also called a reservoir model. Generally, this technique computes a rough model which is equivalent to the fine model from the point of view of the dynamic properties (that is to say the properties linked to the flow of the fluids, such as the permeability).

A flow simulator. Flow simulator is software run on a computer that makes possible determining simulations of the flow of fluids in a deposit. These simulations are performed by solving a system of equations with partial derivatives representative of the flows, by using, for example, finite volume methods applied to a meshed representation. Generally, in a reservoir simulation trial, the reservoir engineer defines a period over which he or she wants to simulate the flows in the formation of interest. Then, these equations are solved by a numerical scheme, time step after time step, the size of the time step (possibly being a function or a constant) being intrinsically linked to the numerical scheme chosen, in order to guarantee the stability of this numerical scheme. The result of a reservoir simulation is, in particular, a succession of snapshots (like images taken at different moments) representative of the state of flow of the fluids in the formation being studied. For example, the PumaFlow® software (IFP Énergies nouvelles, France) is a flow simulator.

The method according to the invention comprises at least the following steps:
1. Determination of a meshed representation with the diagenetic state of a facies entered
   1.1. Experimental measurements
   1.2. Characterization of the diagenetic state
   1.3. Filling of the meshed representation
2. Production history matching
   2.1. Determination of petrophysical properties
   2.2. Production data simulation
   2.3. Iterative optimization process
3. Exploitation of the hydrocarbons of the formation The various steps of the method according to the invention are detailed hereinbelow.

1. Determination of a Meshed Representation with the Diagenetic State of a Facies Entered During this step, the goal is, from at least measurements performed on at least one rock sample obtained from the formation, to determine a value of at least one parameter representative of the diagenetic state of at least one given facies present in a given mesh, and to do so for each of the meshes of the meshed representation representative of the subterranean formation being studied.

Advantageously, this step is performed by several rock samples obtained from the subterranean formation, taken at different spatial locations of the formation, to characterize as accurately as possible the diagenetic state of the facies encountered in the formation.

1.1. Experimental Measurements

During this substep, the goal is to characterize the diagenetic state of at least one facies present in at least one rock sample obtained from the subterranean formation studied.

According to one implementation of the invention, this characterization can be performed by an analysis of thin slices extracted from a coring. This analysis, which is performed under a conventional microscope and/or under an electron microscope, gives access to a vast amount of petrographic information concerning the rock sample being studied (texture, type of grains, type of diagenetic phases, porosity, etc.). In this way it is possible to identify, for example, the different diagenetic phases undergone by a facies, and possibly to quantify the diagenetic degree of each of these diagenetic phases (it is for example possible to qualify whether the facies being considered has undergone a low, average or high degree of the diagenetic phase considered). According to a variant embodiment of the invention, this characterization of the diagenetic state of a rock sample from thin slices can be performed by an image analysis (for example by a point-counting image processing software).

Advantageously, this substep can be repeated for all of the rock samples available for the subterranean formation being studied. The repetition of these steps with all of the samples gives access to the qualitative and/or quantitative vertical and lateral trend of the information being desired (for example, the type and the proportions of the grains, of the diagenetic phases, of the porous network, etc.).

Advantageously, this substep can be repeated for all of the facies present in the rock sample or samples that are considered.

1.2. Characterization of the Diagenetic State

From the experimental analysis described previously, it is possible to deduce therefrom information on the diagenetic state of the facies being studied, such as, for example, on the nature and on the proportion (qualitative and/or quantitative) of the different diagenetic phases undergone by the facies.

According to the invention, this diagenetic state is characterized by at least one parameter. This parameter can relate to:

The spatial variability of the diagenetic degrees of at least one diagenetic phase undergone by a given facies This spatial variability can be assessed by geostatic techniques, which are well known, from information on the diagenetic state obtained during the preceding substep, for example from an analysis of thin slices. It is for example possible to construct a variogram of the spatial distribution of the diagenetic degrees for each of the diagenetic phases of a given facies, and to parameterize the diagenetic state of this phase by the range of this variogram (cf. Le Ravalec et al., 1999). This spatial variability can also be represented by random numbers making it possible to generate a realization of a random function, these numbers controlling the spatial distribution of the heterogeneities. According to one implementation of the invention, it is possible, for this, to use the gradual deformation method (Hu, 2000), the probability perturbation method (Caers and Hoffman, 2006) or the cosimulation deformation method (Le Ravalec-Dupin and Da Veiga, 2011) to modify the random numbers and obtain a new realization of the random function being considered, that is to say a realization showing a different distribution of the degrees of the diagenetic phases in space.

The proportions of the diagenetic degrees of at least one diagenetic phase undergone by a given facies: According to one implementation of the invention, a parameterization based on the proportions of the diagenetic degrees of a diagenetic phase observed in one and the same facies is based on the intensity of this diagenetic phase. An example of such a parameterization is given in Table 1. In this example, three facies are considered (facies A, B and C) and are affected by any diagenetic phase whose proportion in each of the facies is qualified as "low" (denoted L), "moderate" (denoted M) and "high" (denoted H). In the case of this example, nine parameters are to be updated by the history matching. However, in reality, the sedimentary facies and the diagenetic phases undergone by a given facies are more numerous. Furthermore, the proportions vary significantly in space. It would then be necessary to process a considerable number of parameters, which would make it difficult to solve the problem.

According to an implementation of the invention intended to reduce the number of parameters to be determined, the variations of the proportions of diagenetic degree of at least one diagenetic phase are driven from a single coefficient "a", defined for each of the diagenetic phases being considered, and varying between 0 and 1. The value of this coefficient, called control diagenetic degree, corresponds to the proportion of one of the diagenetic degrees of a given diagenetic phase, the proportions of the other diagenetic degrees of the phase being considered are constant relative to one another. For example, in the case of three proportions P1, P2 and P3 (corresponding respectively to a "low", "medium", "high" proportion) of a given diagenetic phase of a given facies, such a parameterization can be defined as follows:

$$pP1_{new}=a$$

$$pP2_{new}=(1+(pP1_{init}-a)/(pP2_{init}+pP3_{init}))pP2_{init}$$

$$pP3_{new}=(1+(pP1_{init}-a)/(pP2_{init}+pP3_{init}))pP3_{init}$$

where p is the notation used to indicate a proportion, init indicates the initial values of the proportions of diagenetic degree and new those after adjustment. Thus, in this example of parameterization, the control diagenetic degree is the degree P1, the proportion of the control degree is given by the parameter a, and the proportions of the other diagenetic degrees derive directly therefrom. Thus, according to this parameterization, the coefficient a becomes the only parameter to be adjusted: by modifying it, all the proportions of the diagenetic degrees are modified for the diagenetic phase being considered of the facies under consideration. Thus, if the proportion of diagenetic degree P1 is increased by 10%, the proportions of the diagenetic degrees P2 and P3 are reduced commensurately. However, the ratio is preserved between the proportions of the diagenetic degrees P2 and P3. According to a variant of the invention, this parameterization can be implemented for each of the N diagenetic phases of a given facies. According to another implementation of the invention, a group of diagenetic degrees is used instead of a single control degree for each diagenetic phase (for example, the control group L+M is formed in the example previously described). According to another alternative, the proportion of a given diagenetic degree or of a group of diagenetic degrees is set as constant, and only the proportions of the other diagenetic degrees are modified. Subsequently, this parameterization will be called "parameterization by control degree(s)".

TABLE 1

|  | L | M | H |
|---|---|---|---|
| Facies A | 33.3% | 16.7% | 50% |
| Facies B | 50% | 50% | 0 |
| Facies C | 100% | 0 | 0 |

This substep culminates with the availability of at least one value of at least one parameter reflecting the diagenetic state of at least one facies, for at least one rock sample taken in the formation.

1.3. Filling of the Meshed Representation

During this substep, the meshed representation is completed (which at this stage contains at least the information relating to the proportion of facies) with the values of at least one parameter reflecting the diagenetic state of at least one of the facies, values determined by the implementation of the preceding two substeps.

Because of the restricted number of rock samples, the information concerning the parameter representative of the diagenetic state of a facies can be limited in space. According to one embodiment of the invention, the filling of the meshes of the meshed representation may require recourse to simulations of geostatistical type. Advantageously, the filling of the meshes takes into account the continuity and of the connectivity of the geological structures under study.

According to one implementation of the invention, the technique described in the document (Renard et al., 2008) is used to generate a meshed representation showing the distribution of the facies and of the diagenetic phases per facies. This technique is a bi-plurigaussian simulation, considering two plurigaussian models, with one being for the facies and one being for the diagenesis. Doligez et al. (2011) or Barbier et al. (2012) present application cases and apply plurigaussian, bi-plurigaussian simulation techniques, or even nested techniques.

Thus, this step culminates with the availability of a meshed representation for which, in each mesh, at least one value is entered for at least one parameter representative of the diagenetic state of at least one facies present in the subterranean formation being studied.

2. Production History Matching

During this step, the measured production data, is updated with the values present in the meshes of the meshed representation relating to at least one parameter representative of the diagenetic state of at least one facies.

2.1. Determination of Petrophysical Properties

During this substep, initially, the values are converted relating the parameters representative of the diagenetic state into petrophysical properties, such as the porosity and the permeability. In this way, the meshed representation includes properties relating to the flows in the formation.

The techniques for such a conversion are known. For example see (Doligez et al., 2011 and Barbier et al., 2012).

2.2. Production Data Simulation

During this substep, a flow simulator and of the meshed representation filled with petrophysical properties on completion of the preceding substep, to simulate production data relating to the formation. This step is resolved by use of a flow simulator, such as the PumaFlow® software (IFP Energies nouvelles, France).

Very preferentially and in order to have measured and simulated production data that can be compared, the production data simulation is performed at locations in the meshed representation corresponding to the real locations of the wells passing through the formation being studied for which measured production data are available.

Very preferentially and in order to have measured and simulated production data that can be compared, the flow simulator is used to simulate the same type of production data as the type of production data being measured. Type of production data should be understood for example to mean the cumulative volume of oil produced, the oil flow rate, the "water cut" (ratio of the volume of water produced to the total volume of liquid produced), the pressure, the ratio of the volume of gas to the volume of oil, etc. It can also be a well test.

2.3. Iterative Optimization Process

During this substep, an objective function for measuring at least the difference between the measured production data and the production data simulated during the preceding substep is determined, then iteratively, the values of the parameters representative of the diagenetic state are determined that make it possible to satisfy a certain predefined stop criterion.

According to one implementation of the invention, an objective function is estimated by measuring the difference between the measured production data and the simulated production data in the sense of the standard L2. According to one embodiment of the invention, the objective function is expressed according to a formula:

$$F(\lambda) = \sum_{i=1}^{Nwell} \omega_{p,i} \frac{1}{N_{time}(i)} \sum_{n=1}^{N_{time}(i)} \left( \frac{P_{i,n}^{obs} - P_{i,n}^{sim}(\lambda)}{\sigma_p(i)} \right)^2$$

in which
$N_{well}$ is the number of wells
$P^{obs}$ is all of the measured production data
$P^{stm}$ is all of the simulated production data,
$\Box_p$ are the weights associated with the production data,
$\Box_p(i)$ is the confidence interval on the production data at the well i,
$N_{time}$ represents the number of measurements performed over time for the well i,
$\Box=(\Box_1, \Box_2, \ldots, \Box_M)$ which are the M parameters representative of the diagenetic state of a facies.

Advantageously, the objective function can include other terms, in particular a term which minimizes a deviation between simulated seismic data and measured seismic data and/or a so-called regularizing term that reduces the space of the possible solutions.

According to one implementation of the invention, in addition to the parameters representative of the diagenetic state of at least one facies, a parameter representative of the distribution of facies in the subterranean formation under study is also updated. Such a parameter can relate to the spatial distribution of the facies (see for example the document Le Ravalec et al., 1999), or even the proportions of facies (see for example the document EP 1978379 A1 (corresponding to U.S. Pat. No. 7,970,593)).

According to another implementation of the invention, in addition to the parameters representative of the diagenetic state of at least one facies, the petrophysical properties relating to the flow in the subterranean formation being studied are also updated. Such a parameter can relate to the spatial distribution of the values of porosities or permeabilities in the facies. Reference will be able to be made to the document (Le Ravalec et al., 2014) for such a matching.

There are various techniques for optimizing an objective function. For example, the gradients-based method, as described for example in (Gosselin et al., 2000), is known. Generally, since the objective function relating to the problem being studied is nonlinear, these optimization techniques solve the problem posed iteratively. From the estimation of the objective function on a given iteration, that is to say for a set of parameters on a given iteration, a set of parameters is estimated that makes possible lowering the value of the objective function on the next iteration, and this is done by accounting for characteristics of the objective function (such as, for example, the gradient of the objective function in the case of the abovementioned gradients method). For each iteration, an estimation of the objective function is performed. In particular, on each iteration, production data are simulated on the meshed representation of the current iteration. This iterative process is stopped when a predefined stop criterion is reached. This criterion can be based on the value of the objective function (for example when the estimation of the cost function has reached a minimum or even is below a threshold predefined by the expert), on the measurement of the difference between simulated production data and measured production data (for example when the route mean square difference is below a threshold predefined by the expert), or even when a maximum number of iterations of the iterative process, has been reached. It is known how to predefine such iterative optimization process stop criteria.

The updating according to the invention of the values of the parameters representative of the diagenetic state of a given facies by history data matching can be done for a single mesh of the meshed representation, for all of the meshed representation (i.e. for all the meshes of the meshed representation) or even over certain identified zones (one or more sets of neighboring meshes) previously identified by a reservoir engineer.

According to one implementation of the invention, the updating according to the invention of the values of the parameters representative of the diagenetic state of a given facies by production history data matching is applied for all of the lithologic facies of a subterranean representation. Advantageously, the updating according to the invention of the values of the parameters representative of the diagenetic state of a given facies by history data matching is applied for the facies of the formation under study that have undergone diagenetic phases most impacting the flow-related petrophysical properties.

3. Exploitation of the Hydrocarbons of the Formation

During this step, the goal is, initially, to define at least one scheme for exploiting the hydrocarbons contained in the formation, by accounting for the predefined technical-economic criteria. The scheme may be a scenario offering a high rate of recovery of the fluid, over a longer period of exploitation, and requiring a limited number of wells. Then, according to the invention, the fluid of the formation under study is exploited according to this optimal exploitation scheme.

According to the invention, the determination of the exploitation scheme is performed using a flow simulation using at least the meshed representation of the formation under study which is updated on completion of the history matching step according to the invention. Indeed, on completion of the step 2 described previously, there is a meshed representation available that satisfies the measured production data. An example of flow simulator is the Puma-Flow software (IFP Energies nouvelles, France).

According to the invention, at any instant t of the simulation, the flow simulator solves all of the flow equations specific to each mesh and delivers values that are solutions of the unknowns (saturations, pressures, concentrations, temperature, etc.) predicted at this instant t. From this resolution, flows, the knowledge of the quantities of oil produced and of the state of the deposit (distribution of the pressures, saturations, etc.) at the instant are considered. From a given exploitation scenario, from the meshed representation of the deposit, it is then possible to simulate the production of hydrocarbons that can be expected, by use of the flow simulator.

The definition of a scheme for exploiting the fluid of the formation under study can choose a type of recovery method (for example a method of recovery by water injection) then in determining, for this type of method, the number, the geometry and the layout (position and spacing) of the injection and production wells. In order to define an optimal exploitation scheme, different tests of different production scenarios can be performed using a flow simulator. The exploitation scheme that offers the best fluid recovery rate for the lowest cost will, for example, be preferred.

By selecting various scenarios, characterized for example by various respective layouts of the injection and the production wells, and by simulating the fluid production for each of them, it is possible to select the scenario that makes it possible to optimize the production from the formation being considered according to predefined technical-economic criteria.

The exploitation of the fluid of the formation according to the scenario is used that makes it possible to optimize the production from the deposit. For example drilling the injection and production wells defined by the optimal exploitation scheme and/or by implementing the recovery method defined by the optimal exploitation scheme may be utilized.

The invention further relates to a computer program product that can be downloaded from a communication network and/or saved on a computer-readable medium and/or that can be executed by a processor, comprising program code instructions for implementing the method according to one of the preceding features, when the program is run on a computer.

Exemplary Embodiment

The features and advantages of the method according to the invention will become more clearly apparent on reading the following exemplary application.

Figure 1A:
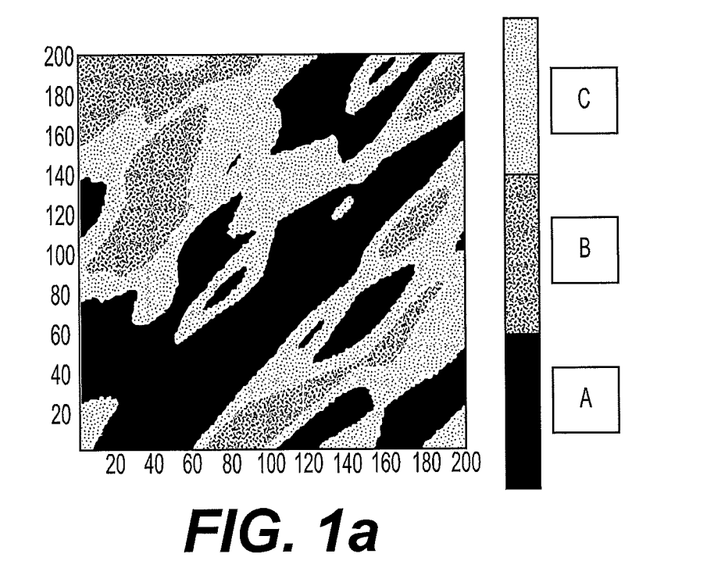
FIG. 1a presents the distribution of the facies for a section with z constant in a meshed representation of a subterranean formation.
Figure 1B:
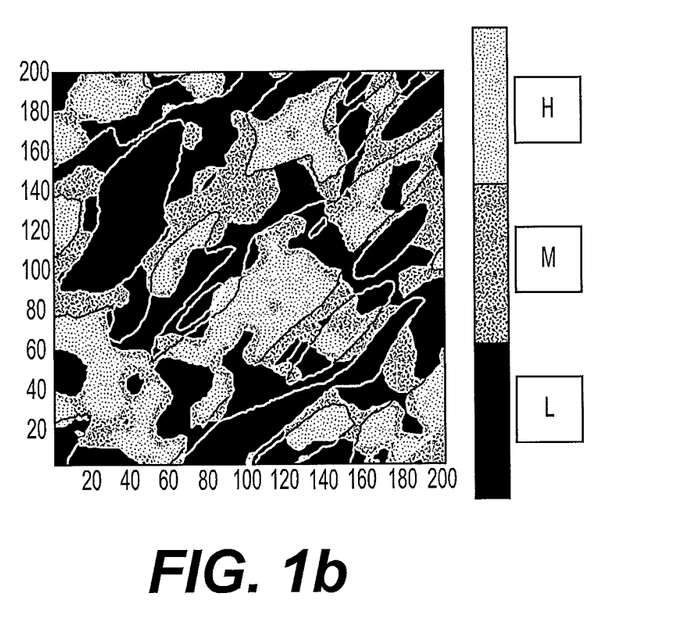

The deposit studied for this illustration corresponds to a subterranean formation characterized by 3 facies (denoted A, B and C). Each of these facies is affected by a (single) diagenetic phase whose degree of transformation or diagenetic degree varies from low (denoted "L"), medium (denoted "M") to high (denoted "H"). The proportions of these diagenetic degrees have been determined by the analysis of the thin slices produced on a rock sample originating from the formation under study (see substep 1.1 described above) and are reported in Table 1 presented previously. The meshed representation representative of this formation is made up of 200×200×100 meshes. Each mesh comprises at least one indicator relating to the facies encountered (facies denoted A, B, or C) in the mesh being considered and the proportions relating to the diagenetic degrees of the diagenetic phase being considered (as presented in Table 1), for each of the facies encountered in the mesh. The distribution of the facies and the distribution of the proportions of diagenetic degree for each facies for a section at given constant depth are presented respectively in FIG. 1a and in FIG. 1b (the outlines superimposed on the map of distribution of the diagenetic degrees refer back to limits of the facies A, B and C presented in FIG. 1a).

According to the invention, a parameterization is defined that is representative of the diagenetic state of each of the facies encountered in the formation (see substep 1.2 described previously). By way of illustration, three modes of implementation of the invention are presented hereinbelow, according to three different parameterizations:

a) Model of Spatial Variability and Range of the Variogram

Figure 2:
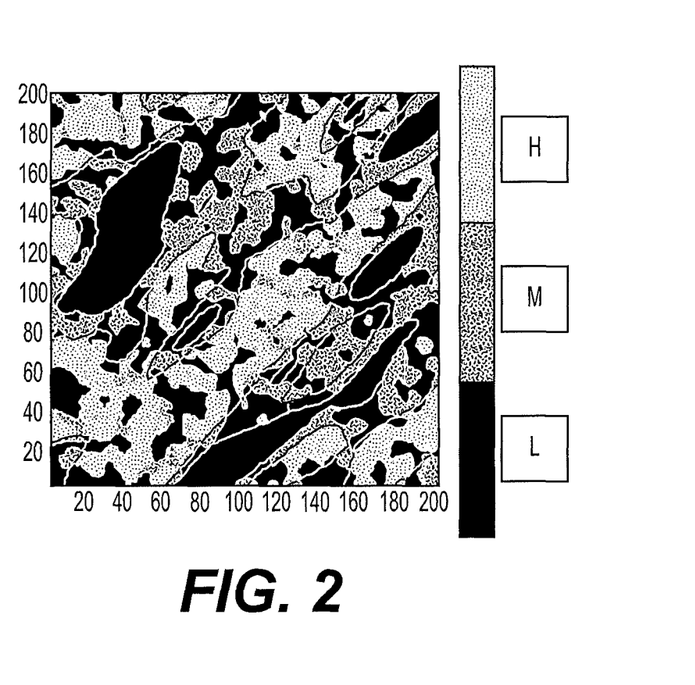
FIG. 2 presents the distribution of the diagenetic degrees by facies for the same section with z constant as that presented in FIG. 1a, obtained after an update of a parameter representative of the distribution of the diagenetic degrees according to a first implementation of the invention.
Figure 3:
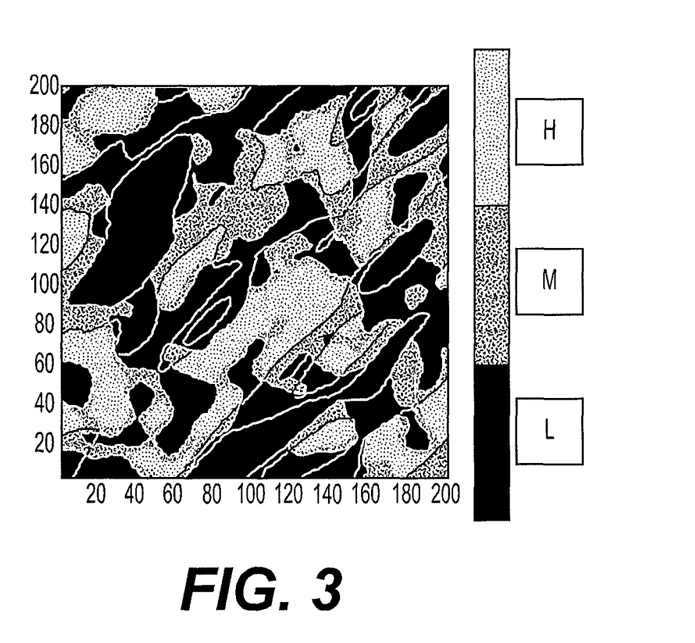
FIG. 3 presents the distribution of the diagenetic phases by facies for the same section with z constant as that presented in FIG. 1a, obtained after an update of a parameter representative of the distribution of the diagenetic degrees according to a second implementation of the invention.

For this first implementation, a variogram is established that describes the spatial variability of the proportions of diagenetic degree by facies, and the range is determined therefrom. As an illustration, the range of the variogram is modified by dividing it artificially by 2. The distribution of the proportions of diagenetic degree by facies resulting therefrom is presented in FIG. 2 and is to be compared with the distribution in FIG. 1b. For the facies C, no modification can be seen since this facies contains only the low diagenetic degree (100% value of the degree L in Table 1). For the other two facies, it can be seen that the heterogeneities of the diagenetic degrees are much smaller.

b) Variation of the Spatial Distribution of the Heterogeneities by Gradual Deformation For this second implementation, a variogram is established that describes the spatial variability of the diagenetic degrees undergone by a given facies, and random numbers are generated to produce a realization of the random function defined by the variogram. As an illustration, the gradual deformation method is used to modify the random numbers. The model of the diagenetic degrees which are obtained is presented in FIG. 3 and is to be compared with FIG. 1b. The gradual deformation parameter applied is 0.1, which produces a low perturbation of the random numbers and therefore a low perturbation of the position of the heterogeneities. This perturbation is nevertheless sufficient to show a modification of the distribution of the heterogeneities of the diagenetic degrees in the facies A and B. For the facies C, no modification can be seen since this facies contains only the low diagenetic degree (100% value of the degree L in Table 1).

c) Variation of the Proportions of the Diagenetic Degrees

Figure 4:
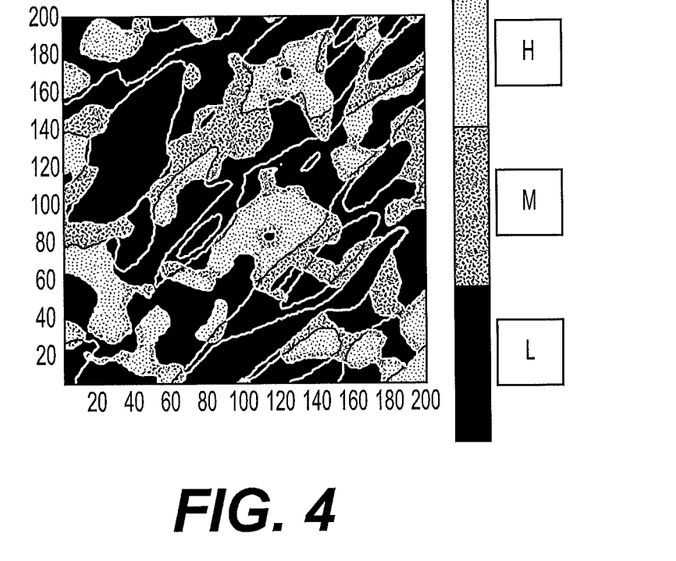
FIG. 4 presents the distribution of the diagenetic phases by facies for the same section with z constant as that presented in FIG. 1a, obtained after an update of a parameter representative of the distribution of the diagenetic degrees according to a third implementation of the invention.

For this third implementation, the particular parameterization presented in section 1.2 is used, concerning the representation of the proportions of the diagenetic degrees observed in one and the same facies, allowing for a control by a parameter a attached to at least one control diagenetic degree. For this example, the control diagenetic degree is defined as being the degree L in the facies A, and its proportion is described by the parameter a. As an illustration, the proportion of the low (L) diagenetic degree is increased in the facies A, by changing from of a proportion of ⅓ to ½ for this diagenetic degree. FIG. 4 presents the distribution of the diagenetic degrees resulting therefrom. An increase in the proportion of the degree L can clearly be seen while the proportions of the different degrees in the other facies remain relatively unchanged.

The history matching method is then applied according to the invention, from production data measured on the subterranean formation as described previously.

For this implementation of the method according to the invention, only the values of the parameters representative of the diagenetic state of the facies A are updated. The values of the parameters representative of the diagenetic state of the other facies have been obtained elsewhere and are set for the implementation of the invention.

During this implementation of the method according to the invention, the diagenetic state of the facies A is parameterized by the proportions of the diagenetic degrees undergone by this facies, by using the so-called control diagenetic degree parameterization (as presented in the substep 1.2). For this implementation, the parameter a corresponds to the proportion of the diagenetic degree L in the facies A.

Figure 5:
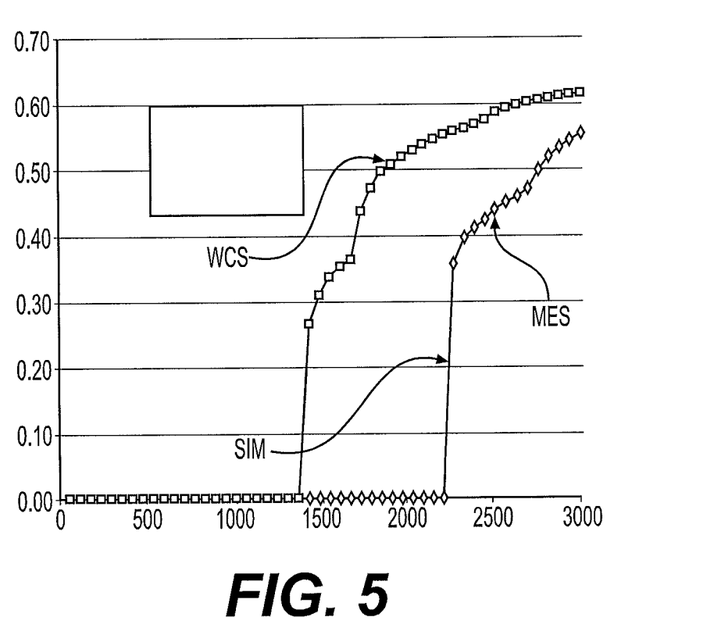
FIG. 5 presents the trend of the "water cut" measured over time, simulated on the first iteration of an implementation of the method according to the invention, and simulated on the final iteration of this implementation of the method according to the invention.

The subterranean formation under study is exploited from 2 wells which are a water injection well in the bottom left corner and a production well in the top right corner. The injection and production flow rates are 200 m3/day. The water cut (water production relative to the total volume of liquid) values measured MES at the production well on different dates are presented in the rhomboids of FIG. 5. The break-through time, that is to say the moment when water breaks through to the production well, is 2250 days. Moreover, the measurements performed on the formation (by coring in particular) make it possible to establish petrophysical properties associated with the different pairings (facies, diagenetic degree) as reported in Table 2.

TABLE 2

| Facies | Diagenetic degree | Porosity (%) | Permeability (mD) |
|--------|-------------------|--------------|-------------------|
| A | L | 0.30 | 500 |
| A | M | 0.15 | 100 |
| A | H | 0.05 | 1 |
| B | L | 0.20 | 200 |
| B | M | 0.10 | 50 |
| C | L | 0.05 | 2 |

In order to begin the iterative updating process according to the invention, a value of a parameter a controlling the diagenetic degree L equal to 0.38 is defined. In other words, the iterative history matching process according to the invention is started by considering a distribution of the diagenetic degrees characterized by a proportion of the degree L (low) in the facies A of 38%.

By use of a flow simulator, the trend over time of the water cut is simulated for this value of the parameter a. The water cut simulated WCS on the meshed representation comprising the value of 0.38 for the parameter a is presented in FIG. 5 by the curve including squares, whereas the measured water cut MES is presented by the points symbolized by rhomboids in this same figure. It can be seen that, these curves being relatively distant from one another and a significant updating of the parameter a is required by the method according to the invention. Moreover, it can be seen that the simulated break-through time, of 1400 days, is significantly lower than the measured break-through time, of 2250 days, on the deposit under study.

For this implementation of the invention, an objective function is considered that is composed only of a measurement of the difference between the measured water cut and the simulated water cut and a stop criterion based on the minimization of this objective function.

Then, the parameter a representative of the diagenetic state of the facies A is modified iteratively, by of the objective function evaluated on each iteration and a simulated water cut is evaluated on each of the iterations of the iterative process, on the meshed representation of the current iteration.

Figure 6:
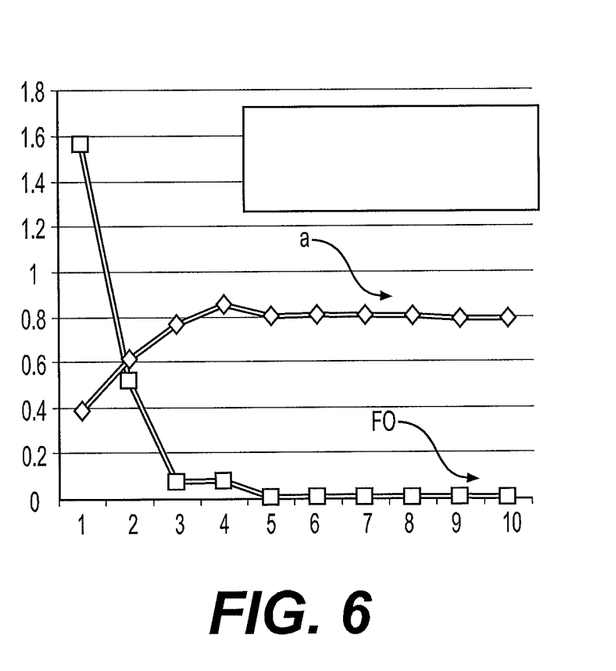
FIG. 6 presents the trend, during iterations of the method according to the invention, of the objective function and of the parameter representative of the diagenetic state to be adjusted in the case of the implementation of the method according to the invention corresponding to that of FIG. 5.

For this example, the objective function FO reaches a minimum at the end of 10 iterations (see curve with squares in FIG. 6). The so-called control degree parameter a obtained on the iteration then has the value 0.8038 (see curve with rhomboids in FIG. 6). The trend of the water cut over time, simulated for the meshed representation determined on the iteration 10, is presented in FIG. 5 by the solid line curve denoted SIM. It can be seen that this curve is perfectly superimposed on the discrete values of the measured water cut MES (rhomboids in FIG. 5).

Thus, the method according to the invention makes it possible to account for the diagenetic state of a facies as a parameter for adjusting production data measured on a subterranean formation including hydrocarbons. Such a method makes possible accounting more exhaustively for the complexity of the geological phenomena undergone by a subterranean formation. In effect, the present invention makes it possible to account for, among other things, of the diagenetic processes undergone by sediments since their deposition and throughout the process of burial thereof. These processes significantly affecting the flow properties of the rock resulting from this sedimentary deposition. The present invention therefore makes it possible to obtain a meshed representation of a subterranean formation filled with more reliable and/or realistic flow properties, and makes it possible, de facto, to improve the exploitation of the hydrocarbons of the formation.

The invention claimed is:

1. A method for exploiting a subterranean formation including hydrocarbons, the formation including at least one facies which has undergone at least one diagenetic phase over geological time, from at least one sample of rock obtained from the formation, from measured production data relating to the formation and from a meshed representation representative of the formation with the meshed representation having been formed by meshes, each of the meshes of the meshed representation including at least one indicator relating to distribution of the at least one facies present in the mesh, comprising steps of:

A. determining from at least measurements performed on the at least one sample of rock, for at least one of the facies of the formation and for each of the meshes of the meshed representation, a value of at least one parameter of a diagenetic state of the at least one facies of the formation; and B. updating at least values of the parameters of the diagenetic state of at least one of the facies of the formation from the measured production data, for at least one mesh of the meshes of the meshed representation, according to the following steps:
  i. determining at least one petrophysical property relating to flow in the formation for each of the meshes of the meshed representation, from the values of the parameters of the diagenetic state of the at least one facies of the formation;
  ii. using a flow simulator and the meshed representation filled with petrophysical properties relating to the flow to simulate production data relating to production of the formation;
  iii. determining an objective function measuring at least one difference between the measured production data and the simulated production data; and
  iv. modifying at least the value of the parameters of the diagenetic state of the at least one facies of the formation from the objective function for at least one of the meshes of the meshed representation; and
  reiterating steps i) to iv) until a predetermined stop criterion is reached; and
  determining a scheme for exploiting the hydrocarbons of the formation and exploiting the hydrocarbons of the formation with at least the determined scheme for exploiting the hydrocarbons of the formation.

2. The method as claimed in claim 1, wherein the at least one parameter representative of the diagenetic state of the at least one facies of the formation corresponds to a spatial variability of at least one diagenetic degree of at least one of the diagenetic phases undergone by the facies.

3. The method as claimed in claim 2, wherein in step B), at least one parameter representative of at least one of a distribution of the facies in the formation and petrophysical properties relating to flow in the formation are also updated.

4. The method as claimed in claim 3, wherein step B), ii) is performed by a bi-plurigaussian simulation.

5. The method as claimed in claim 2, wherein step B), ii) is performed by a bi-plurigaussian simulation.

6. The method as claimed claim 2, in wherein the predetermined stop criterion corresponds to a minimum of the objective function, to a maximum number of iterations of step B), or to a maximum difference between the measured production data and the simulated production data.

7. The method as claimed in claim 2, wherein the spatial variability is parameterized by a range of a variogram relating to a distribution of the at least one diagenetic degree of the at least one diagenetic phase.

8. The method as claimed in claim 7, wherein in step B), at least one parameter representative of at least one of a distribution of the facies in the formation and petrophysical properties relating to flow in the formation are also updated.

9. The method as claimed in claim 7, wherein step B), ii) is performed by a bi-plurigaussian simulation.

10. The method as claimed in claim 7, wherein the predetermined stop criterion corresponds to a minimum of the objective function, to a maximum number of iterations of step B), or to a maximum difference between the measured production data and the simulated production data.

11. The method as claimed in claim 1, wherein the at least one parameter representative of the diagenetic state of the at least one facies of the formation corresponds to a proportion of at least one diagenetic degree of at least one of the diagenetic phases undergone by the facies.

12. The method as claimed in claim 11, wherein the at least one parameter corresponds to a proportion of at least one of the diagenetic degrees in proportion to other diagenetic degrees which remain constant.

13. The method as claimed in claim 11, wherein in step B), at least one parameter representative of at least one of a distribution of the facies in the formation and petrophysical properties relating to flow in the formation are also updated.

14. The method as claimed in claim 11, wherein step B), ii) is performed by a bi-plurigaussian simulation.

15. The method as claimed in claim 11, wherein the predetermined stop criterion corresponds to a minimum of the objective function, to a maximum number of iterations of step B), or to a maximum difference between the measured production data and the simulated production data.

16. The method as claimed in claim 12, wherein in step B), at least one parameter representative of at least one of a distribution of the facies in the formation and petrophysical properties relating to flow in the formation are also updated.

17. The method as claimed in claim 12, wherein step B), ii) is performed by a bi-plurigaussian simulation.

18. The method as claimed in claim 12, wherein the predetermined stop criterion corresponds to a minimum of the objective function, to a maximum number of iterations of step B), or to a maximum difference between the measured production data and the simulated production data.

19. The method as claimed in claim 1, wherein in step B), at least one parameter representative of at least one of a distribution of the facies in the formation and petrophysical properties relating to flow in the formation are also updated.

20. The method as claimed in claim 19, wherein the predetermined stop criterion corresponds to a minimum of the objective function, to a maximum number of iterations of step B), or to a maximum difference between the measured production data and the simulated production data.

21. The method as claimed in claim 1, wherein step B), ii) is performed by a bi-plurigaussian simulation.

22. The method as claimed in claim 21, wherein the predetermined stop criterion corresponds to a minimum of the objective function, to a maximum number of iterations of step B), or to a maximum difference between the measured production data and the simulated production data.

23. The method as claimed in claim 1, wherein the predetermined stop criterion corresponds to a minimum of the objective function, a maximum number of iterations of step B), and a maximum difference between the measured production data and the simulated production data.

24. The method as claimed in claim 1, wherein the determination of the exploitation scheme comprises determination of a position and at least one geometry of injection and production wells, and a determination of a type of assisted recovery.

25. A computer program product which is downloadable from a communication network and stored on a non-transitory storage medium for execution by a processor, comprising program code instructions for implementing the method as claimed in claim 1.

* * * * *